(12) United States Patent
Miyamoto (10) Patent No.: US 10,757,282 B2
(45) Date of Patent: Aug. 25, 2020

(54) IMAGE FORMING APPARATUS CAPABLE OF NOTIFYING UNCOLLECTED PRINTED MATTER, NOTIFICATION METHOD

(71) Applicant: KYOCERA Document Solutions Inc., Osaka-shi, Osaka (JP)

(72) Inventor: Kenji Miyamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/394,191

(22) Filed: Apr. 25, 2019

(65) Prior Publication Data

US 2019/0335051 A1 Oct. 31, 2019

(30) Foreign Application Priority Data

Apr. 26, 2018 (JP) .................................. 2018-085263

(51) Int. Cl.
*G06F 3/12* (2006.01)
*H04N 1/00* (2006.01)

(52) U.S. Cl.
CPC ..... *H04N 1/00891* (2013.01); *H04N 1/00053* (2013.01); *H04N 1/00082* (2013.01)

(58) Field of Classification Search
None
See application file for complete search history.

(56) References Cited

U.S. PATENT DOCUMENTS 6,152,629 A * 11/2000 Yoneyama ............. B65H 39/10
 400/582
2014/0153005 A1 * 6/2014 Hayamizu .......... H04N 1/00488
 358/1.5

FOREIGN PATENT DOCUMENTS

JP 2013054209 A 3/2013

* cited by examiner

*Primary Examiner* — Huo Long Chen
(74) *Attorney, Agent, or Firm* — Alleman Hall Creasman & Tuttle LLP (57) ABSTRACT

An image forming apparatus includes a control portion, a stop processing portion, a resumption processing portion, and a notification processing portion. The control portion, to which power supply is stopped when an operation mode of the image forming apparatus is a power-saving mode, measures an elapsed time until when printed matter processed according to the print job is collected. The stop processing portion, when the operation mode shifts to the power-saving mode, stops measurement of the elapsed time before power supply to the control portion is stopped. The resumption processing portion, if the printed matter exists in the sheet discharge portion when the operation mode shifts to a normal mode, resumes measurement of the elapsed time by the control portion. The notification processing portion, when the time measured by the control portion reaches a predetermined first reference time, notifies that the printed matter has not been collected.

4 Claims, 7 Drawing Sheets

IMAGE FORMING APPARATUS CAPABLE OF NOTIFYING UNCOLLECTED PRINTED MATTER, NOTIFICATION METHOD

INCORPORATION BY REFERENCE

This application is based upon and claims the benefit of priority from the corresponding Japanese Patent Application No. 2018-085263 filed on Apr. 26, 2018, the entire contents of which are incorporated herein by reference.

BACKGROUND

The present disclosure relates to an image forming apparatus configured to execute a print job that is transmitted from an external portion, and a notification method that is executed in the image forming apparatus.

There is known an image forming apparatus such as a multifunction peripheral configured to execute a print job that is transmitted from an external information processing apparatus. This type of image forming apparatus is known to notify that output printed matter has not been collected. For example, in this type of image forming apparatus, when an uncollected state of printed matter of a print job continues for longer than a predetermined period of time, it is notified to a transmission source of the print job that the printed matter has not been collected.

In addition, there is known an image forming apparatus that can shift its operation mode from a normal mode to a power-saving mode, in which less power is used than in the normal mode. Specifically, in the power-saving mode, power supply to some of the components of the image forming apparatus is stopped.

SUMMARY

An image forming apparatus according to an aspect of the present disclosure includes a sheet discharge portion, a control portion, a stop processing portion, a resumption processing portion, and a notification processing portion. The control portion, to which power supply is stopped when an operation mode of the image forming apparatus is a power-saving mode in which less power is used than a normal mode, measures an elapsed time that is a time period from when a print job transmitted from an external portion ends, until when printed matter processed according to the print job is collected from the sheet discharge portion. The stop processing portion is configured to, when the operation mode shifts from the normal mode to the power-saving mode, stop measurement of the elapsed time by the control portion before power supply to the control portion is stopped. The resumption processing portion is configured to, if the printed matter exists in the sheet discharge portion when the operation mode shifts from the power-saving mode to the normal mode, resume measurement of the elapsed time by the control portion. The notification processing portion is configured to, when the time measured by the control portion reaches a predetermined first reference time, notify a notification destination corresponding to a transmission source of the print job, that the printed matter has not been collected.

A notification method according to another aspect of the present disclosure is executed in an image forming apparatus comprising a sheet discharge portion, the image forming apparatus further comprising a control portion, to which power supply is stopped when an operation mode of the image forming apparatus is a power-saving mode in which less power is used than a normal mode, configured to measure an elapsed time that is a time period from when a print job transmitted from an external portion ends, until when printed matter processed according to the print job is collected from the sheet discharge portion. The notification method comprises a stopping step of, when the operation mode shifts from the normal mode to the power-saving mode, stopping measurement of the elapsed time by the control portion before power supply to the control portion is stopped, a resuming step of, if the printed matter exists in the sheet discharge portion when the operation mode shifts from the power-saving mode to the normal mode, resuming measurement of the elapsed time by the control portion, and a notifying step of, when the time measured by the control portion reaches a predetermined first reference time, notifying a notification destination corresponding to a transmission source of the print job, that the printed matter has not been collected.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[General Configuration of Image Forming Apparatus 100]

Figure 1:
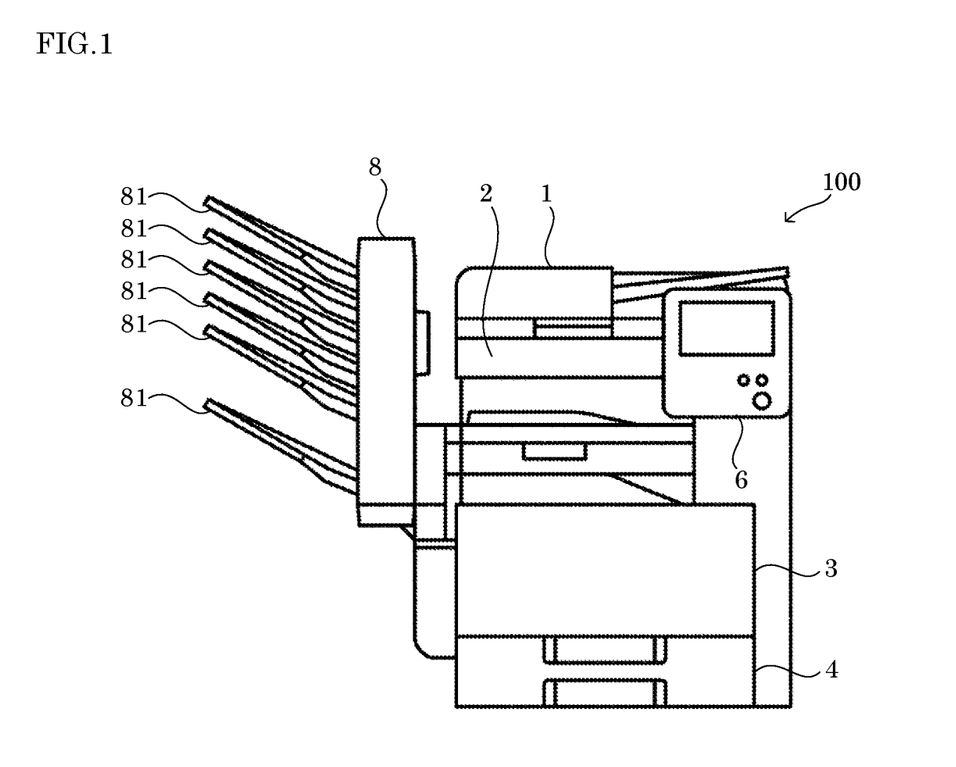
FIG. 1 is a diagram showing a configuration of an outer appearance of an image forming apparatus according to an embodiment of the present disclosure.
Figure 2:
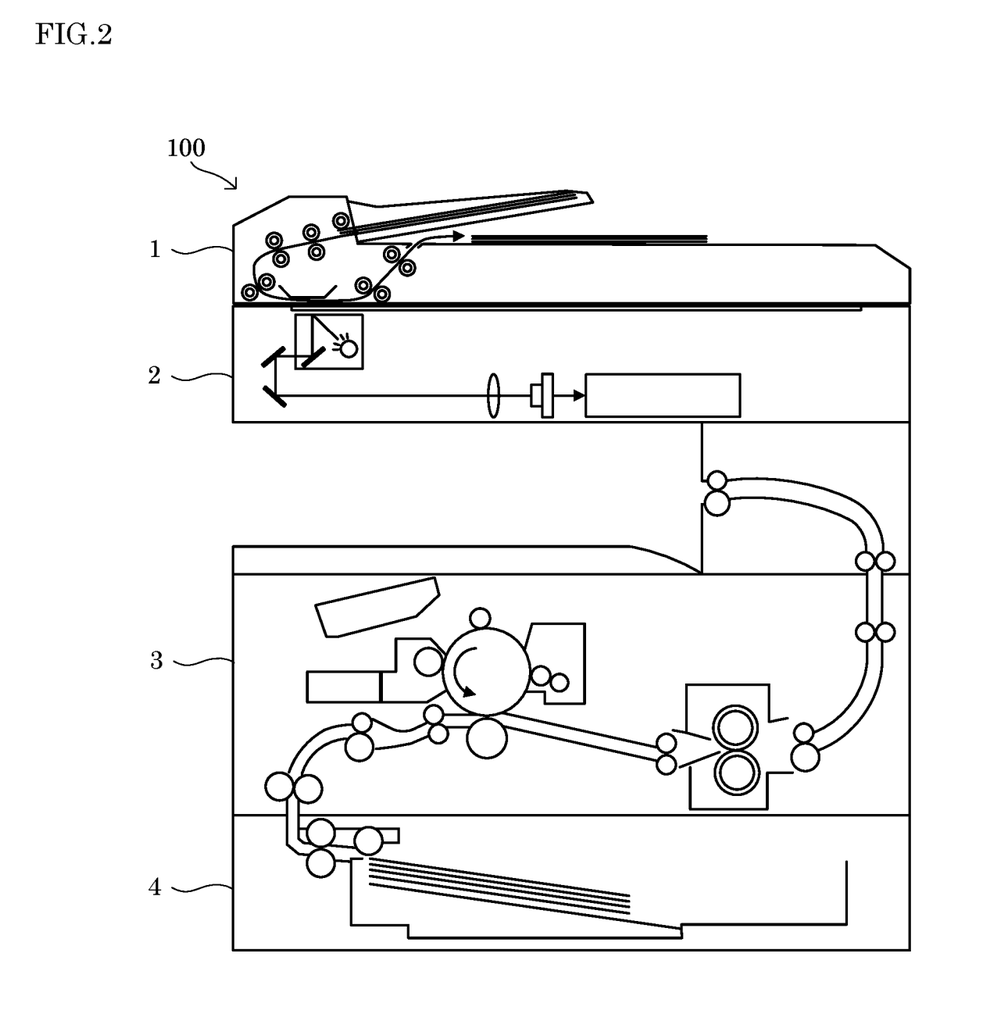
FIG. 2 is a diagram showing a configuration of the inside of the image forming apparatus according to the embodiment of the present disclosure.
Figure 3:
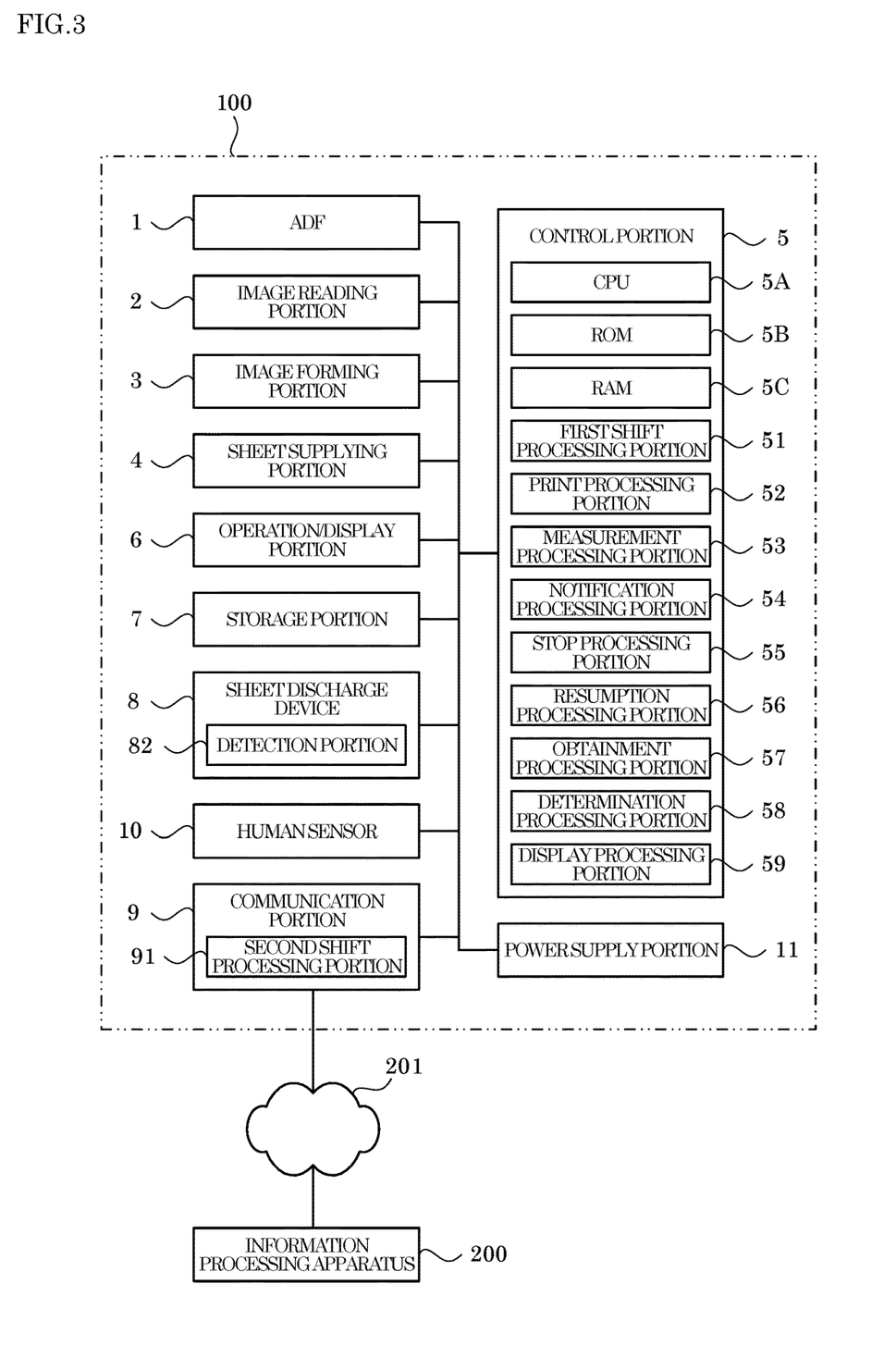
FIG. 3 is a block diagram showing a system configuration of the image forming apparatus according to the embodiment of the present disclosure.

With reference to FIG. 1 to FIG. 3, a general configuration of an image forming apparatus 100 according to the embodiment of the present disclosure is described. Here, FIG. 1 is a front view showing a configuration of an outer appearance of the image forming apparatus 100. FIG. 2 is a cross-sectional diagram showing an inner configuration of the image forming apparatus 100 in a state where a sheet discharge device 8 has been removed therefrom. In addition, FIG. 3 includes a two-dot chain line that separates the inside and outside of the image forming apparatus 100.

The image forming apparatus 100 is a multifunctional peripheral having a plurality of functions, such as a scanning function for reading image data from a document sheet, a printing function for forming an image based on image data, a facsimile function, and a copying function. It is noted that the present disclosure may be applied to an image forming apparatus such as a printer apparatus, a facsimile apparatus, or a copier.

As shown in FIG. 1 to FIG. 3, the image forming apparatus 100 includes an ADF (Automatic Document Feeder) 1, an image reading portion 2, an image forming portion 3, a sheet supplying portion 4, a control portion 5, an operation/display portion 6, a storage portion 7, the sheet discharge device 8, a communication portion 9, a human sensor 10, and a power supply portion 11.

The ADF 1 includes a document sheet setting portion, a plurality of conveyance rollers, a document sheet holder, and a sheet discharge portion. The ADF 1 is configured to convey, to the sheet discharge portion, a document sheet that is set in the document sheet setting portion.

The image reading portion 2 includes a document sheet table, a light source, a plurality of mirrors, an optical lens, and a CCD. The image reading portion 2 is configured to read image data from a document sheet that is placed on the document sheet table. In addition, the image reading portion 2 is configured to read image data from a document sheet that is conveyed by the ADF 1.

The image forming portion 3 is configured to electrophotographically form an image based on the image data read by the image reading portion 2. In addition, the image forming portion 3 may be configured to form an image based on image data input from an external information processing apparatus 200 (see FIG. 3) such as a personal computer, via a communication network 201 (see FIG. 3). Specifically, the image forming portion 3 includes a photoconductor drum, a charging roller, a laser scanning unit (LSU), a developing device, a transfer roller, a cleaning device, a fixing roller, a pressure roller, and a sheet discharge tray. It is noted that the image forming portion 3 may form an image by another image forming method, such as an ink jet method.

The sheet feeding portion 4 includes a sheet feeding cassette, a sheet conveyance path, and a plurality of conveyance rollers. The sheet feeding portion 4 supplies a sheet to the image forming portion 3. On the sheet supplied from the sheet supplying portion 4, the image forming portion 3 forms an image based on image data. In the image forming apparatus 100, the sheet on which the image has been formed by the image forming portion 3 is conveyed to the sheet discharge device 8 instead of the sheet discharge tray.

As shown in FIG. 3, the control portion 5 includes control devices such as a CPU 5A, a ROM 5B, and a RAM 5C. The CPU 5A is a processor for executing various types of arithmetic processing. The ROM 5B is a nonvolatile storage device in which information, such as a control program for the CPU 5A to execute the various types of processing, is preliminarily stored. The RAM 5C is a volatile storage device used as temporary storage memory (work area) for the various types of processing that are executed by the CPU 5A. In the control portion 5, various types of control programs, preliminarily stored in the ROM 5B, are executed by the CPU 5A. This allows for the image forming apparatus 100 to be integrally controlled by the control portion 5. It is noted that the control portion 5 may be constituted by an electronic circuit such as an integrated circuit (ASIC), and may be provided separately from a main control portion that integrally controls the image forming apparatus 100.

The operation/display portion 6 includes a display portion such as a liquid crystal display for displaying various types of information in response to a control command from the control portion 5, and an operation portion such as operation keys or a touch panel for inputting various types of information to the control portion 5, in response to an operation by a user.

The storage portion 7 is a non-volatile storage device. For example, the storage portion 7 is a non-volatile memory such as a flash memory or an EEPROM, an SSD (Solid State Drive), or an HDD (Hard Disk Drive).

The sheet discharge device 8 includes a plurality of sheet discharge trays 81, and a plurality of detection portions 82 of the same number as the sheet discharge trays 81. As shown in FIG. 1, the plurality of sheet discharge trays 81 are juxtaposed along a vertical direction. The detection portions 82 are provided in correspondence to the sheet discharge trays 81. The sheet discharge device 8, according to a control command from the control portion 5 of the image forming apparatus 100, discharges a sheet on which an image has been formed to a preset sheet discharge tray 81, among the plurality of sheet discharge trays 81. The detection portion 82 is an optical sensor or the like for detecting whether or not a sheet exists in the sheet discharge tray 81 corresponding to the detection portion 82. Here, the sheet discharge tray 81 is an example of a sheet discharge portion according to the present disclosure.

The communication portion 9 is a communication interface for executing wired or wireless data communication with the external information processing apparatus 200 (see FIG. 3) via the communication network 201 (see FIG. 3).

The human sensor 10 is configured to detect whether or not a person exists on a front side of a housing of the image forming apparatus 100. For example, the human sensor 10 is a pyroelectric infrared sensor for detecting, based on whether or not infrared rays emitted from a human body are detected, whether or not a person exists within a predetermined detection range.

The power supply portion 11 is configured to supply electric power from an external power source to the parts of the image forming apparatus 100. For example, the power supply portion 11 is an AC-DC converter for converting an AC voltage of 100V that is supplied from the external power source, into a DC voltage of a predetermined voltage.

In addition, as shown in FIG. 3, the control portion 5 includes a first shift processing portion 51, a print processing portion 52, a measurement processing portion 53, and a notification processing portion 54. Specifically, the ROM 5B of the control portion 5 is preliminarily stored with a notification control program for causing the CPU 5A to execute a first notification control process (see flowchart in FIG. 4) and a second notification control process (see flowchart in FIG. 6), both described below. The CPU 5A of the control portion 5 executes the notification control program stored in the ROM 5B. With this configuration, the control portion 5 functions as the first shift processing portion 51, the print processing portion 52, the measurement processing portion 53, and the notification processing portion 54. It is noted that the notification control program is stored in a computer-readable recording medium such as a CD, DVD, or flash memory, and may be installed from the recording medium to a storage device such as the storage portion 7.

When a predetermined first shift condition is satisfied, the first shift processing portion 51 shifts an operation mode of the image forming apparatus 100 from a normal mode to a power-saving mode, in which less power is used compared to the normal mode.

Here, the first shift condition includes that a predetermined time period of no operation being performed on the operation/display portion 6, has elapsed. In addition, the first shift condition includes that a change operation of the operation mode has been performed by a user on the operation/display portion 6. In addition, the first shift condition includes that a power supply key, provided on the operation/display portion 6 or a side surface or the like of the housing of the image forming apparatus 100, has been operated. In addition, the first shift condition includes that a detection state of the human sensor 10 has changed from a detected state where the existence of a person is detected, to an undetected state where the existence of a person is not detected. It is noted that the first shift condition may include some of the conditions described above, and may include a condition other than those described above.

Specifically, when the first shift condition has been satisfied, the first shift processing portion 51 stops power supply from the power supply portion 11 to predetermined power supply stop objects among the components of the image forming apparatus 100. For example, the first shift processing portion 51 stops power supply to the power supply stop objects by inputting a control signal to the power supply portion 11.

Here the power supply stop objects include, in addition to the image reading portion 2 and the image forming portion 3, the control portion 5. That is, in the image forming apparatus 100, when the operation mode is in the power-saving mode, power supply to the control portion 5 is stopped. In addition, the power supply stop objects do not include the communication portion 9 and the human sensor 10. That is, in the image forming apparatus 100, even when the operation mode is in the power-saving mode, power supply to the communication portion 9 and human sensor 10 is uninterrupted.

The print processing portion 52 uses the image forming portion 3, the sheet supplying portion 4, and the sheet discharge device 8 to execute a print job of forming an image based on image data. Specifically, the print processing portion 52 executes the print job when the print job is transmitted from the external information processing apparatus 200. In addition, the print processing portion 52 discharges printed matter to a sheet discharge tray 81, among the plurality of sheet discharge trays 81, that has been specified as a discharge place by information included in the print job.

The measurement processing portion 53 measures the time that elapses from when the print job executed by the print processing portion 52 ends, until when the printed matter processed according to the print job is collected from the sheet discharge tray 81. The measurement processing portion 53 measures the elapsed time for each print job that is executed by the print processing portion 52.

When the elapsed time measured by the measurement processing portion 53 reaches a predetermined first reference time, the notification processing portion 54 notifies, to a notification destination corresponding to a transmission source of the print job, that the printed matter has not been collected.

Here, the first reference time is a time period for determining whether or not the user of the information processing apparatus 200 has forgotten to collect the printed matter. That is, when the time measured by the measurement processing portion 53 reaches the first reference time, the image forming apparatus 100 determines that the user of the information processing apparatus 200 has forgotten to collect the printed matter, and notifies to the notification destination that the printed matter has not been collected.

For example, the first reference time is arbitrarily set by a user operation on the operation/display portion 6 or information processing apparatus 200. For example, the first reference time is set to a time obtained by adding, to an arbitrary amount of time such as 30 minutes, the time needed for the user of the information processing apparatus 200 to move from an installed position of the information processing apparatus 200 to an installed position of the image forming apparatus 100. It is noted that the first reference time may be set for each information processing apparatus 200 that is connected to the image forming apparatus 100 via the communication network 201.

For example, when the time measured by the measurement processing portion 53 reaches the first reference time, the notification processing portion 54 notifies, to the information processing apparatus 200 that is the transmission source of the print job that corresponds to the measured time, that the printed matter has not been collected. For example, the notification processing portion 54 transmits, to the information processing apparatus 200, a display command for displaying a message indicating that the printed matter has not been collected. It is noted that the notification destination may be an email address that is associated with the information processing apparatus 200 that is the transmission source of the print job.

In addition, as shown in FIG. 3, the communication portion 9 includes a second shift processing portion 91. For example, the second shift processing portion 91 is constituted by an electronic circuit such as an integrated circuit (ASIC, DSP) that is provided in the communication portion 9. It is noted that the communication portion 9 includes control devices such as a CPU, a ROM, and a RAM, and may use these control devices to function as the second shift processing portion 91.

When a second shift condition is satisfied while the operation mode is in the power-saving mode, the second shift processing portion 91 shifts the operation mode from the power-saving mode to the normal mode.

Here, the second shift condition includes that a print job is received from the information processing apparatus 200. In addition, the second shift condition includes that a detection state of the human sensor 10 has changed from the undetected state to the detected state. It is noted that the second shift condition may include some of the conditions described above, and may include a condition other than those described above.

Specifically, when the second shift condition is satisfied while the operation mode is in the power-saving mode, the second shift processing portion 91 resumes power supply from the power supply portion 11 to the power supply stop objects. For example, the second shift processing portion 91 resumes power supply to the power supply stop objects by inputting a control signal to the power supply portion 11.

Meanwhile, in the image forming apparatus 100, the control portion 5 is included among the power supply stop objects when the image forming apparatus 100 is in the power-saving mode. For this reason, when the image forming apparatus 100 shifts to the power-saving mode before the printed matter processed according to the print job has been collected, the image forming apparatus 100 is unable to measure how long the printed matter is in the uncollected state. As a solution to this issue, there is known a configuration that, when the operation mode shifts to the power-saving mode before the printed matter has been collected, notifies later, when the operation mode shifts to the normal mode is entered, that the printed matter has not been collected.

However, when it is notified after the shift to the normal mode that the printed matter has not been collected, the timing of the notification may be too early if a total time including the time from the end of the print job to when the operation mode shifts to the power-saving mode, and the time of how long the operation mode is in the power-saving mode, is shorter than the first reference time. When the notification timing of the uncollected printed matter is too early, the user may feel that the notification is a nuisance. As a solution to this issue, as described below, in the image forming apparatus 100 according to the embodiment of the present disclosure, even when the operation mode shifts to the power-saving mode before the printed matter has been collected, it is possible to secure, during the time from when the print job ends until when the notification of the uncollected printed matter is transmitted, a time period that exceeds the first reference time.

Specifically, as shown in FIG. 3, the control portion 5 further includes a stop processing portion 55, a resumption processing portion 56, an obtainment processing portion 57, a determination processing portion 58, and a display processing portion 59. The CPU 5A of the control portion 5 executes the notification control program that is stored in the ROM 5B. This allows for the control portion 5 to function as the stop processing portion 55, the resumption processing portion 56, the obtainment processing portion 57, the determination processing portion 58, and the display processing portion 59.

When the operation mode of the image forming apparatus 100 shifts from the normal mode to the power-saving mode, the stop processing portion 55, before the first shift processing portion 51 stops power supply to the control portion 5, stops measurement of the elapsed time by the measurement processing portion 53. Specifically, the stop processing portion 55 stops measurement of the elapsed time so that the measurement of the elapsed time can be resumed later.

For example, when the stop processing portion 55 stops measurement of the elapsed time by the measurement processing portion 53, the stop processing portion 55 generates stop state information. The stop state information includes recognition information that indicates the print job for which elapsed time measurement is stopped, the elapsed time that is measured by the measurement processing portion 53 until when the measurement is stopped, and the time of day when the measurement is stopped. Then, the stop processing portion 55 stores the generated stop state information in the storage portion 7.

If printed matter exists in the sheet discharge trays 81 when the operation mode of the image forming apparatus 100 shifts from the power-saving mode to the normal mode, the resumption processing portion 56 resumes measurement of the elapsed time by the measurement processing portion 53.

Specifically, when the operation mode of the image forming apparatus 100 shifts from the power-saving mode to the normal mode, the resumption processing portion 56 determines whether or not the stop state information has been stored in the storage portion 7.

Here, when the resumption processing portion 56 determines that the stop state information has been stored in the storage portion 7, the resumption processing portion 56 determines, for each piece of stop state information that is stored in the storage portion 7, whether or not the printed matter, processed according to the print job that corresponds to the stop state information, exists in the sheet discharge tray 81. Specifically, the resumption processing portion 56, by using the detection portion 82 corresponding to the sheet discharge tray 81 that is set as the discharge place by information included in the print job, determines whether or not the printed matter exists in the sheet discharge tray 81.

When the resumption processing portion 56 determines that the printed matter processed according to the print job exists in the sheet discharge tray 81, the resumption processing portion 56 resumes measurement of the elapsed time by the measurement processing portion 53. Specifically, the resumption processing portion 56 uses the elapsed time included in the stop state information of the print job to resume measurement of the elapsed time by the measurement processing portion 53. On the other hand, when the resumption processing portion 56 determines that the printed matter processed according to the print job does not exist in the sheet discharge tray 81, the resumption processing portion 56 deletes the stop state information of the print job from the storage portion 7.

When the resumption processing portion 56 resumes measurement of the elapsed time by the measurement processing portion 53, the obtainment processing portion 57 obtains a stop time that is a time period from when the measurement of the elapsed time was stopped by the stop processing portion 55, until when the measurement of the elapsed time is resumed by the resumption processing portion 56.

Specifically, the obtainment processing portion 57 obtains the stop time based on the time of day when the measurement was stopped that is included in the stop state information, and the time of day when the measurement of the elapsed time is resumed by the resumption processing portion 56.

When the stop time is obtained by the obtainment processing portion 57, the notification processing portion 54 determines whether or not the stop time exceeds a predetermined second reference time. When the notification processing portion 54 determines that the stop time exceeds the second reference time, the notification processing portion 54 notifies the notification destination that the printed matter has not been collected. On the other hand, when the notification processing portion 54 determines that the stop time does not exceed the second reference time, the notification processing portion 54 waits to notify the notification destination until the time measured by the measurement processing portion 53 reaches the first reference time.

For example, the second reference time is a time obtained by subtracting, from the first reference time, the elapsed time included in the stop state information that is measured until when the measurement is stopped. It is noted that the second reference time may be the same time as the first reference time. In addition, the second reference time may be arbitrarily set by a user operation on the operation/display portion 6 or information processing apparatus 200.

It is noted that the control portion 5 may not include the obtainment processing portion 57. In this case, the notification processing portion 54 notifies the notification destination based only on the time measured by the measurement processing portion 53.

When the detection portion 82 detects that the sheet discharge tray 81, to which the printed matter processed according to the print job has been discharged, has changed from an existing state where the printed matter exists in the sheet discharge tray 81, to a non-existing state where the printed matter does not exist in the sheet discharge tray 81, the determination processing portion 58 determines whether or not the printed matter processed according to the print job has been collected.

For example, the determination processing portion 58 determines whether or not the printed matter has been collected based on how long the sheet discharge tray 81 that has been detected to have changed from the existing state to the non-existing state, is in the non-existing state, and whether or not an empty sheet discharge tray 81 is detected to have changed from the non-existing state to the existing state.

Specifically, the determination processing portion 58 determines that the printed matter has been collected when the sheet discharge tray 81 that has been detected to have changed from the existing state to the non-existing state, is in the non-existing state for a duration of time that exceeds a predetermined holding time, and during the duration, an empty sheet discharge tray 81 is not detected to have changed from the non-existing state to the existing state. On the other hand, the determination processing portion 58 determines that the printed matter has not been collected when the sheet discharge tray 81 that has been detected to have changed from the existing state to the non-existing state, is detected to be in the existing state before the holding time elapses from when the change from the existing state to the non-existing state was detected. In addition, when an empty sheet discharge tray 81 is detected to have changed from the non-existing state to the existing state before the holding time elapses, the determination processing portion 58 determines that the printed matter has not been collected.

Here, the holding time is a predetermined time period. For example, the holding time is an arbitrarily set time period between ten seconds and one minute. The holding time may be arbitrarily set by a user operation on the operation/display portion 6.

The measurement processing portion 53 ends measurement of the elapsed time of the print job when the determination processing portion 58 determines that the printed matter processed according to the print job has been collected from the sheet discharge tray 81. That is, the elapsed time is the time period from when the print job ends, until when the determination processing portion 58 determines that the printed matter has been collected from the sheet discharge tray 81. In addition, when the stop state information corresponding to the print job, for which elapsed time measurement is stopped, is stored in the storage portion 7, the measurement processing portion 53 deletes the stop state information from the storage portion 7.

It is noted that the determination processing portion 58 may determine whether or not the printed matter has been collected based only on how long the sheet discharge tray 81 that has been detected to have changed from the existing state to the non-existing state, is in the non-existing state. Specifically, the determination processing portion 58 may determine that the printed matter has been collected when the sheet discharge tray 81 that has been detected to have changed from the existing state to the non-existing state, is in the non-existing state for a duration of time that exceeds holding time. In addition, the determination processing portion 58 may immediately determine that the printed matter has been collected upon detecting that the sheet discharge tray 81, to which the printed matter processed according to the print job has been discharged, has changed from the existing state to the non-existing state.

In the case where the determination processing portion 58 determines that the printed matter processed according to the print job has not been collected, the display processing portion 59 displays a selection screen X10 (see FIG. 7) on the operation/display portion 6 when one or more other print jobs whose elapsed times are being measured and have the same discharge place as the print job, exist. Here, the selection screen X10 is used for selecting one or more of the print jobs whose printed matter is determined by the determination processing portion 58 to be uncollected, and the one or more other print jobs whose elapsed times are being measured and have the same discharge place as the print job. The operation/display portion 6 is an example of a display portion according to the present disclosure.

Figure 7:
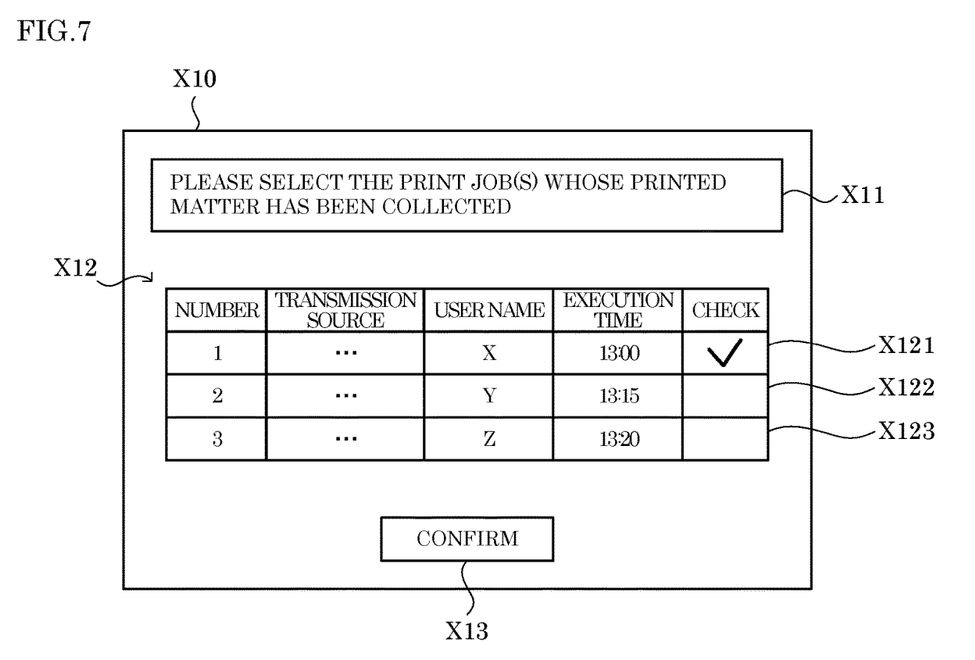
FIG. 7 is a diagram showing an example of a selection screen that is displayed on the image forming apparatus according to the embodiment of the present disclosure.

FIG. 7 shows an example of the selection screen X10. The selection screen X10 includes a message field X11, a print job display field X12, and an operation key X13.

The message field X11 displays a message to the user. The message includes content that prompts a selection operation of selecting the print job whose printed matter has been collected.

The print job display field X12 displays numbers, used to distinguish the print jobs whose elapsed times are being measured by the measurement processing portion 53, listed together with information for identifying each of the print jobs. Specifically, the print job display field X12 displays, as the information for identifying each print job, information that indicates the transmission source of the print job, information that indicates the name of the user that is associated with the transmission source, and the execution start time of the print job. It is noted that the information displayed in the print job display field X12 for identifying the print job is not limited to what is described above, and may include other information, such as the name of the document that is being printed.

The print job display field X12 includes operation reception fields X121 to X123. The operation reception field X121 corresponds to a first print job, the operation reception field X122 corresponds to a second print job, and the operation reception field X123 corresponds to a third print job. The selection operation is performed on the operation reception fields X121 to X123. For example, the selection operation is a tap operation on one of the operation reception fields X121 to X123. It is noted that the operation reception field X121 shown in FIG. 7 is denoted with a check symbol indicating that the selection operation has been performed on the operation reception field X121.

The operation key X13 is used to confirm content of an operation on the selection screen X10.

When one or more print jobs are selected on the selection screen X10, the measurement processing portion 53 ends measurement of the elapsed time for the selected one or more print jobs.

It is noted that when displaying the selection screen X10, the display processing portion 59 may sound an alarm or perform voice guidance to direct the user's attention to the displayed selection screen X10. In addition, the control portion 5 may not include the display processing portion 59.

[First Notification Control Process]

Figure 4:
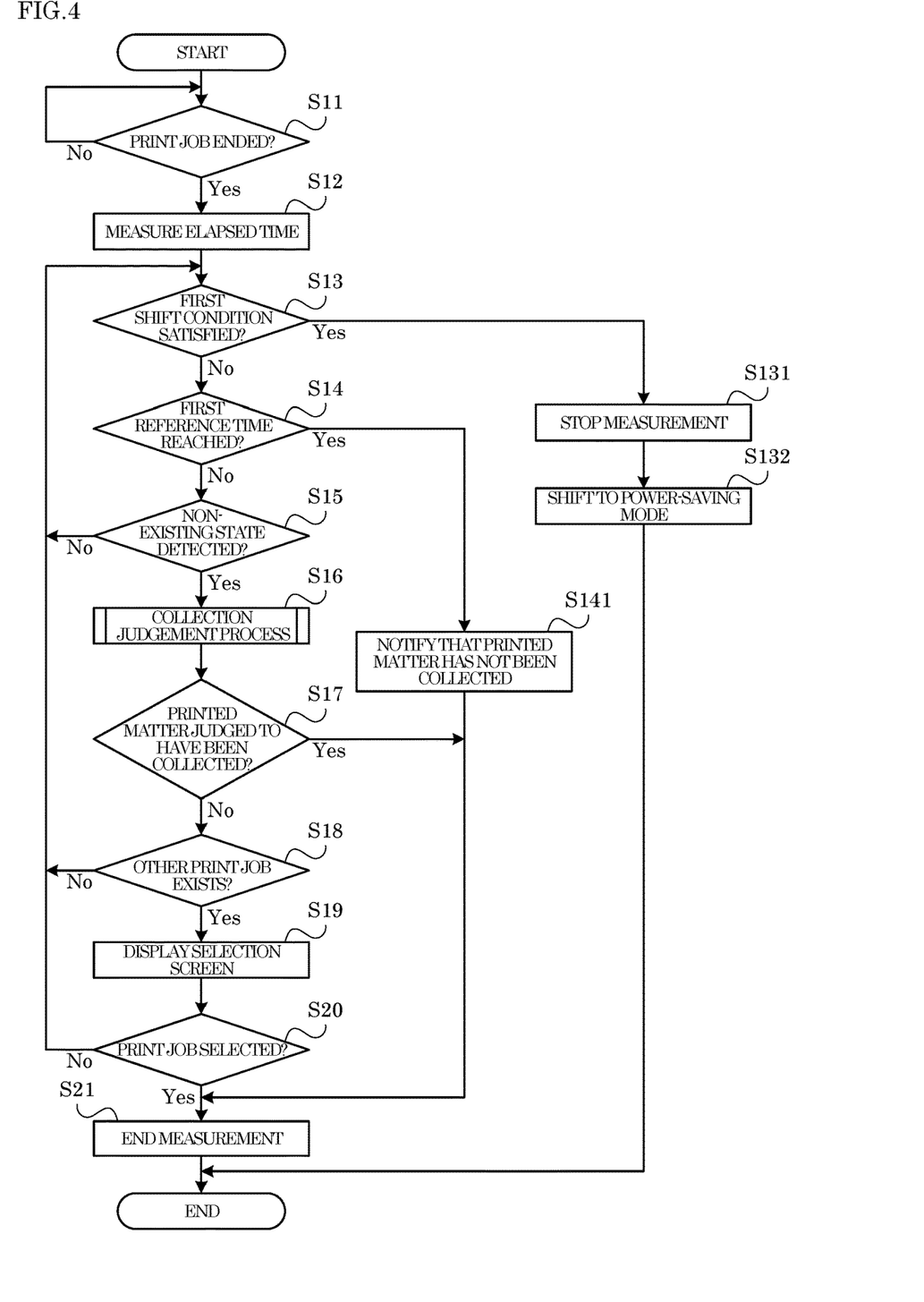
FIG. 4 is a flowchart showing an example of a first notification control process that is executed in the image forming apparatus according to the embodiment of the present disclosure.

Below, with reference to FIG. 4, a description is given of an example procedure of the first notification control process executed by the control portion 5 in the image forming apparatus 100, and an example procedure of a notification method according to the present disclosure. Here, steps S11, S12 . . . indicate the numbers of processing procedures (steps) executed by the control portion 5. In addition, each time the print job is transmitted from the information processing apparatus 200, the first notification control process is executed as a process corresponding to that print job.

<Step S11>

First, in step S11, the control portion 5 determines whether or not the print job has ended.

Here, when the control portion 5 determines that the print job has ended (Yes in S11), the control portion 5 moves the process to step S12. In addition, when the control portion 5 determines that the print job has not ended (No in S11), the control portion 5 waits until it is determined in step S11 that the print job has ended.

<Step S12>

In step S12, the control portion 5 measures the elapsed time of the print job. It is noted that processing in step S13 and after are executed in parallel with processing in step S12. Here, processing in step S12 is executed by the measurement processing portion 53 of the control portion 5.

<Step S13>

In step S13, the control portion 5 determines whether or not the first shift condition has been satisfied.

Here, when the control portion 5 determines that the first shift condition has been satisfied (Yes in S13), the control portion 5 moves the process to step S131. In addition, when the control portion 5 determines that the first shift condition has not been satisfied (No in S13), the control portion 5 moves the process to step S14.

<Step S131>

In step S131, the control portion 5 stops the measurement of the elapsed time in step S12. Here, processing in step S131 is executed by the stop processing portion 55 of the control portion 5.

For example, when stopping the measurement of the elapsed time in step S12, the control portion 5 generates stop state information including recognition information indicating the print job for which elapsed time measurement is stopped, the elapsed time measured by the measurement processing portion 53 until when the measurement is stopped, and the time of day when the measurement is stopped. Then, the control portion 5 stores the generated stop state information in the storage portion 7.

<Step S132>

In step S132, the control portion 5 shifts the operation mode of the image forming apparatus 100 from the normal mode to the power-saving mode. Here, processing in step S132 is executed by the first shift processing portion 51 of the control portion 5.

<Step S14>

In step S14, the control portion 5 determines whether or not the elapsed time that is being measured in step S12 has reached the first reference time.

Here, when the control portion 5 determines that the elapsed time being measured in step S12 has reached the first reference time (Yes in S14), the control portion 5 moves the process to step S141. In addition, when the control portion 5 determines that the elapsed time being measured in step S12 has not reached the first reference time (No in S14), the control portion 5 moves the process to step S15.

<Step S141>

In step S141, the control portion 5 notifies that the printed matter processed according to the print job has not been collected. Here, processing in step S141 is executed by the notification processing portion 54 of the control portion 5.

<Step S15>

In step S15, the control portion 5 determines whether or not the detection portion 82 has detected that the sheet discharge tray 81, to which the printed matter processed according to the print job has been discharged, has changed from the existing state to the non-existing state.

Here, when the control portion 5 determines that the detection portion 82 has detected the change from the existing state to the non-existing state (Yes in S15), the control portion 5 moves the process to step S16. In addition, when the control portion 5 determines that the detection portion 82 has not detected the change from the existing state to the non-existing state (No in S15), the control portion 5 moves the process to step S13.

<Step S16>

In step S16, the control portion 5 executes a collection judgement process described below.

<Step S17>

In step S17, the control portion 5 determines whether or not it has been determined in the collection judgement process executed in step S16 that the printed matter has been collected.

Here, when the control portion 5 determines that it has been judged in the collection judgement process that the printed matter has been collected (Yes in S17), the control portion 5 moves the process to step S21. In addition, when the control portion 5 determines that it has not been judged in the collection judgement process that the printed matter has been collected (No in S17), the control portion 5 moves the process to step S18.

<Step S18>

In step S18, the control portion 5 determines whether or not another print job having the same discharge place as the print job, and whose elapsed time is being measured, exists.

Here, when the control portion 5 determines that the other print job exists (Yes in S18), the control portion 5 moves the process to step S19. In addition, when the control portion 5 determines that the other print job does not exist (No in S18), the control portion 5 moves the process to step S13.

<Step S19>

In step S19, the control portion 5 displays the selection screen X10 on the operation/display portion 6. Here, processing in step S19 is executed by the display processing portion 59 of the control portion 5.

With this configuration, it is possible for the user to select, on the selection screen X10, the printed matter that the user has collected among a plurality of pieces of printed matter discharged to the sheet discharge tray 81, and to prevent transmitting, to the notification destination that corresponds to the collected printed matter, a notification of uncollected printed matter.

<Step S20>

In step S20, the control portion 5 determines whether or not the print job (the print job in execution that corresponds to the first notification control process) has been selected in the selection screen X10 displayed in step S19.

Here, when the control portion 5 determines that the print job has been selected on the selection screen X10 (Yes in S20), the control portion 5 moves the process to step S21. In addition, when the control portion 5 determines that the print job has not been selected on the selection screen X10 (No in S20), the control portion 5 moves the process to step S13.

It is noted that when the selection operation has not been performed after a predetermined time period elapses after the selection screen X10 is displayed, the control portion 5 may stop displaying the selection screen X10, and move the process to step S13.

\<Step S21\>

In step S21, the control portion 5 ends the measurement of the elapsed time in step S12. Here, processing in step S21 is executed by the measurement processing portion 53 of the control portion 5.

It is noted that the first notification control process may not include the processing in steps S18 to S20. In this case, the control portion 5 may move the process to step S13 when it determines in step S17 that it has been judged in the collection judgement process that the printed matter has not been collected.

In addition, the first notification control process may not include the processing in steps S16 to S20. In this case, when the control portion 5 determines in step S15 that the change from the existing state to the non-existing state has been detected, the control portion 5 may determine that the printed matter has been collected, and move the process to step S21.

[Collection Judgement Process]

Figure 5:
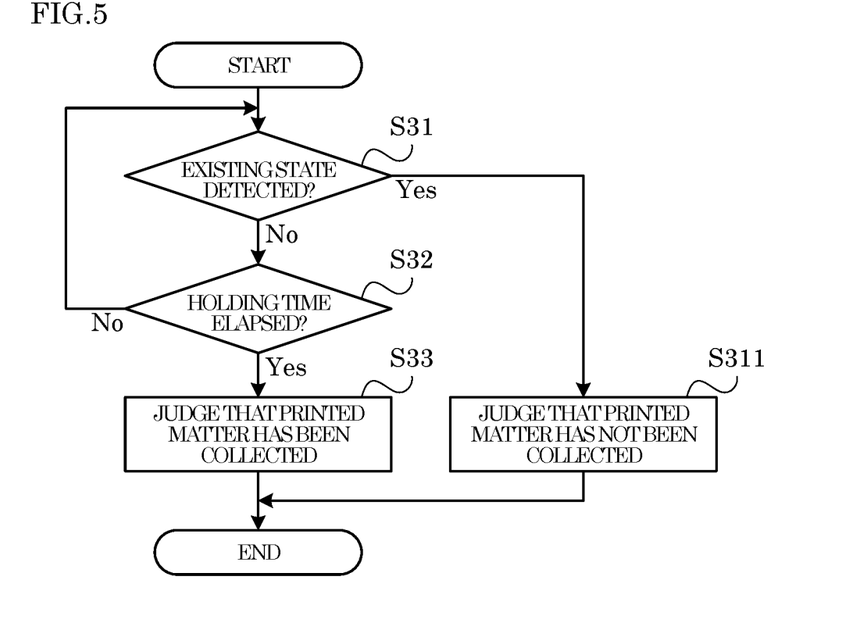
FIG. 5 is a flowchart showing an example of a collection judgement process that is executed in the image forming apparatus according to the embodiment of the present disclosure.

Next, with reference to FIG. 5, a description is given of an example procedure of the collection judgement process that is executed in step S16 of the first notification control process. Here, the collection judgement process is executed by the determination processing portion 58 of the control portion 5.

\<Step S31\>

First, in step S31, the control portion 5 determines whether or not an empty sheet discharge tray 81 has been detected to have changed from the non-existing state to the existing state.

Here, when the control portion 5 determines that an empty sheet discharge tray 81 has been detected to have changed from the non-existing state to the existing state (Yes in S31), the control portion 5 moves the process to step S311. In addition, when the control portion 5 determines that an empty sheet discharge tray 81 has not been detected to have changed from the non-existing state to the existing state in (No in S31), the control portion 5 moves the process to step S32.

\<Step S32\>

In step S32, the control portion 5 determines whether or not the holding time has elapsed from when the collection judgement process was started.

Here, when the control portion 5 determines that the holding time has elapsed from when the collection judgement process was started (Yes in S32), the control portion 5 moves the process to step S33. In addition, when the control portion 5 determines that the holding time has not elapsed from when the collection judgement process was started (No in S32), the control portion 5 moves the process to step S31.

\<Step S33\>

In step S33, the control portion 5 judges that the printed matter processed according to the print job has been collected.

\<Step S311\>

In step S311, the control portion 5 judges that the printed matter processed according to the print job has not been collected.

As described above, in the collection judgement process, even when the sheet discharge tray 81 to which the printed matter has been discharged is detected to change from the existing state to the non-existing state, if the existing state is detected before the holding time elapses, it is judged that the printed matter has not been collected. With this configuration, for example, when the user of the image forming apparatus 100 mistakenly removes printed matter belonging to another user from the sheet discharge tray 81, realizes his or her mistake, and returns the printed matter to the original sheet discharge tray 81, it is possible to prevent the printed matter from being judged as having been collected.

In addition, in the collection judgement process, even when the sheet discharge tray 81 to which the printed matter has been discharged is detected to change from the existing state to the non-existing state, if the existing state of another sheet discharge tray 81 is detected before the holding time elapses, it is judged that the printed matter has not been collected. With this configuration, for example, when the user of the image forming apparatus 100 mistakenly removes printed matter belonging to another user from the sheet discharge tray 81, realizes his or her mistake, and returns the printed matter to another sheet discharge tray 81, it is possible to prevent the printed matter from being judged as having been collected.

[Second Notification Control Process]

Figure 6:
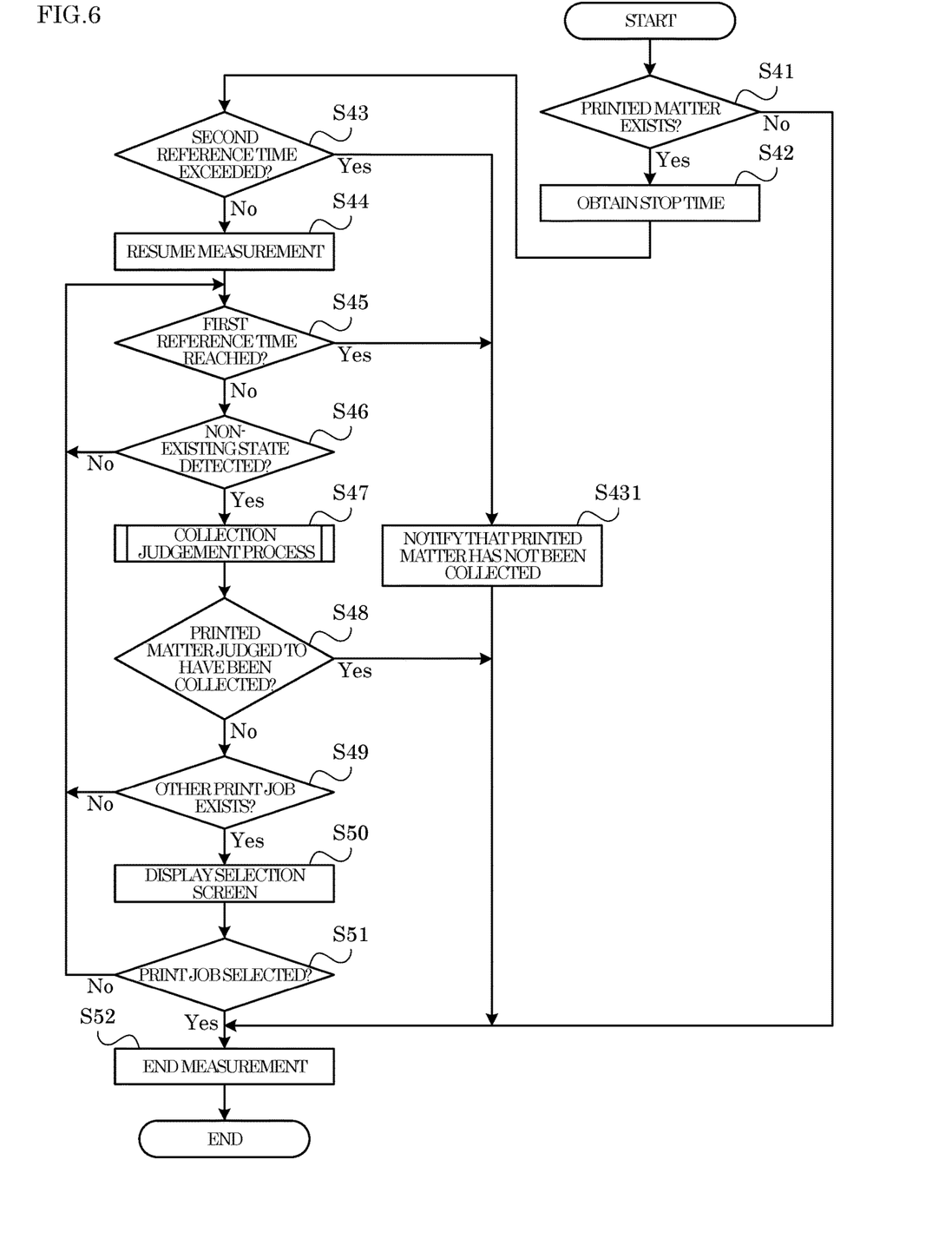
FIG. 6 is a flowchart showing an example of a second notification control process that is executed in the image forming apparatus according to the embodiment of the present disclosure.

Next, with reference to FIG. 6, a description is given of an example procedure of the second notification control process executed by the control portion 5 in the image forming apparatus 100, and an example procedure of a notification method according to the present disclosure. Here, the second notification control process is executed when, after the processing in step S131 of the first notification control process is executed, the operation mode of the image forming apparatus 100 shifts from the power-saving mode to the normal mode.

It is noted that when the operation mode shifts to the normal mode, the control portion 5, based on whether or not the stop state information is stored in the storage portion 7, determines whether or not the operation mode has shifted to the normal mode after the execution of the processing in step S131. In addition, the control portion 5 executes the second notification control process for each print job corresponding to the pieces of stop state information that are stored in the storage portion 7.

\<Step S41\>

First, in step S41, the control portion 5 determines whether or not the printed matter processed according to the print job exists in the sheet discharge tray 81 to which it has been discharged.

Here, when the control portion 5 determines that the printed matter exists in the sheet discharge tray 81 (Yes in S41), the control portion 5 moves the process to step S42. In addition, when the control portion 5 determines that the printed matter does not exist in the sheet discharge tray 81 (No in S41), the control portion 5 moves the process to step S52.

\<Step S42\>

In step S42, the control portion 5 obtains the stop time that is a time period from when the processing in step S131 of the first notification control process is executed, until the present time. Here, processing in step S42 is executed by the obtainment processing portion 57 of the control portion 5.

\<Step S43\>

In step S43, the control portion 5 determines whether or not the stop time obtained in step S42 exceeds the second reference time.

Here, when the control portion 5 determines that the stop time exceeds the second reference time (Yes in S43), the control portion 5 moves the process to step S431. In addition, when the control portion 5 determines that the stop time does not exceed the second reference time (No in S43), the control portion 5 moves the process to step S44.

With this configuration, it is possible to prevent the notification of the uncollected printed matter from being delayed, in comparison to the configuration that notifies the notification destination based only on the time measured by the measurement processing portion 53, in the case where the time in the power-saving mode is long.

<Step S431>

In step S431, the control portion 5, similarly to step S141 of the first notification control process, notifies that the printed matter processed according to the print job has not been collected.

<Step S44>

In step S44, the control portion 5 resumes measurement of the elapsed time that was stopped in step S131 of the first notification control process. Here, processing in step S44 is executed by the resumption processing portion 56 of the control portion 5.

<Step S45>

In step S45, the control portion 5, similarly to step S14 of the first notification control process, determines whether or not the elapsed time that is being measured has reached the first reference time.

Here, when the control portion 5 determines that the elapsed time being measured has reached the first reference time (Yes in S45), the control portion 5 moves the process to step S431. In addition, when the control portion 5 determines that the elapsed time being measured has not reached the first reference time (No in S45), the control portion 5 moves the process to step S46.

<Step S46>

In step S46, the control portion 5, similarly to step S15 of the first notification control process, determines whether or not the detection portion 82 has detected that the sheet discharge tray 81, to which the printed matter processed according to the print job has been discharged, has changed from the existing state to the non-existing state.

Here, when the control portion 5 determines that the detection portion 82 has detected the change from the existing state to the non-existing state (Yes in S46), the control portion 5 moves the process to step S47. In addition, when the control portion 5 determines that the detection portion 82 has not detected the change from the existing state to the non-existing state (No in S46), the control portion 5 moves the process to step S45.

<Step S47>

In step S47, the control portion 5 executes the collection judgement process. It is noted that the collection judgement process that is executed in step S47 is the same process as the collection judgement process that is executed in step S16 of the first notification control process.

<Step S48>

In step S48, the control portion 5, similarly to step S17 of the first notification control process, the control portion 5 determines whether or not it has been judged in the collection judgement process executed in step S47 that the printed matter has been collected.

Here, when the control portion 5 determines that it has been judged in the collection judgement process that the printed matter has been collected (Yes in S48), the control portion 5 moves the process to step S52. In addition, when the control portion 5 determines that it has not been judged in the collection judgement process that the printed matter has been collected (No in S48), the control portion 5 moves the process to step S49.

<Step S49>

In step S49, the control portion 5, similarly to step S18 of the first notification control process, determines whether or not another print job having the same discharge place as the print job, and whose elapsed time is being measured, exists.

Here, when the control portion 5 determines that the other print job exists (Yes in S49), the control portion 5 moves the process to step S50. In addition, when the control portion 5 determines that the other print job does not exist (No in S49), the control portion 5 moves the process to step S45.

<Step S50>

In step S50, the control portion 5, similarly to step S19 of the first notification control process, displays the selection screen X10 on the operation/display portion 6.

<Step S51>

In step S51, the control portion 5, similarly to step S20 of the first notification control process, determines whether or not the print job (the print job in execution that corresponds to the second notification control process) has been selected in the selection screen X10 displayed in step S50.

Here, when the control portion 5 determines that the print job has been selected on the selection screen X10 (Yes in S51), the control portion 5 moves the process to step S52. In addition, when the control portion 5 determines that the print job has not been selected on the selection screen X10 (No in S51), the control portion 5 moves the process to step S45.

<Step S52>

In step S52, the control portion 5 ends the measurement of the elapsed time. In addition, the control portion 5 deletes the stop state information corresponding to the print job from the storage portion 7. Here, processing in step S52 is executed by the measurement processing portion 53 of the control portion 5.

It is noted that the second notification control process may not include the processing in steps S49 to S51. In this case, the control portion 5 may move the process to step S45 when it determines in step S48 that it has been judged in the collection judgement process that the printed matter has not been collected.

In addition, the second notification control process may not include the processing in steps S47 to S51. In this case, when the control portion 5 determines in step S46 that the change from the existing state to the non-existing state has been detected, the control portion 5 may determine that the printed matter has been collected, and move the process to step S52.

As described above, in the image forming apparatus 100, when, during measurement of the elapsed time from the end of the print job to when the printed matter processed according to the print job is collected, the operation mode shifts to the power-saving mode, the measurement of the elapsed time is stopped before power supply to the control portion 5 is stopped. Then, when the operation mode shifts to the normal mode, the measurement of the elapsed time is resumed, and when the elapsed time reaches the first reference time, the notification of the uncollected printed matter is transmitted. Accordingly, even when the operation mode shifts to the power-saving mode before the printed matter is collected, it is possible to secure, during the time from when the print job ends until when the notification of the uncollected printed matter is transmitted, a time period that exceeds the first reference time.

It is noted that the image forming apparatus 100 may not include the sheet discharge device 8. In this case, the printed matter processed according to the print job may be discharged to the sheet discharge tray of the image forming portion 3. In addition, the sheet discharge tray may be provided with a sensor that is similar to the detection portion 82.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus including a sheet discharge portion, the image forming apparatus comprising:
a processor, to which power supply is stopped when an operation mode of the image forming apparatus is a power-saving mode in which less power is used than a normal mode, configured to measure, for each print job transmitted from an external portion, an elapsed time that is a time period from when the print job ends, until when printed matter processed according to the print job is collected from the sheet discharge portion; and
a sensor configured to detect whether or not the printed matter exists in the sheet discharge portion, wherein
the processor is configured to execute calculation processes to function as:
a stop processing portion configured to, when the operation mode shifts from the normal mode to the power-saving mode, stop measurement of the elapsed time by the processor before power supply to the processor is stopped;
a resumption processing portion configured to, if the printed matter exists in the sheet discharge portion when the operation mode shifts from the power-saving mode to the normal mode, resume measurement of the elapsed time by the processor;
a notification processing portion configured to, when the time measured by the processor reaches a predetermined first reference time, notify a notification destination corresponding to a transmission source of the print job, that the printed matter has not been collected;
a determination processing portion configured to, when the sensor detects that the sheet discharge portion changes from an existing state, where the printed matter exists in the sheet discharge portion, to a non-existing state, where the printed matter does not exist in the sheet discharge portion, determine whether or not the printed matter has been collected, based on how long the sheet discharge portion is in the non-existing state; and
a display processing portion configured to, when the determination processing portion determines that the printed matter has not been collected and elapsed times are being measured for a plurality of print jobs, display a selection screen on a display portion, the selection screen used for selecting one or more of the plurality of print jobs,
the elapsed time is a time period from when the print job ends until when the determination processing portion determines that the printed matter has been collected, and
the processor ends measurement of the elapsed time of the print job that is selected on the selection screen.

2. The image forming apparatus according to claim 1, wherein
the processor is further configured to execute calculation processes to function as an obtainment processing portion configured to obtain a stop time that is a time period from when measurement of the elapsed time is stopped by the stop processing portion, until when measurement of the elapsed time is resumed by the resumption processing portion, and
the notification processing portion is configured to, when the stop time exceeds a predetermined second reference time, notify the notification destination that the printed matter has not been collected.

3. The image forming apparatus according to claim 1, further including:
a plurality of sheet discharge portions, and
a plurality of sensors that correspond to the plurality of sheet discharge portions, wherein
the determination processing portion is configured to, when a sensor corresponding to a sheet discharge portion to which the printed matter is discharged, detects that the sheet discharge portion has changed from the existing state to the non-existing state, determine whether or not the printed matter has been collected, based on how long the sheet discharge portion is in the non-existing state, and based on whether or not another sheet discharge portion where printed matter had not existed, has changed from the non-existing state to the existing state.

4. A notification method executed in an image forming apparatus, the image forming apparatus including: a sheet discharge portion; a processor, to which power supply is stopped when an operation mode of the image forming apparatus is a power-saving mode in which less power is used than a normal mode, configured to measure, for each print job transmitted from an external portion, an elapsed time that is a time period from when the print job ends, until when printed matter processed according to the print job is collected from the sheet discharge portion; and a sensor configured to detect whether or not the printed matter exists in the sheet discharge portion, the notification method comprising:
when the operation mode shifts from the normal mode to the power-saving mode, stopping measurement of the elapsed time by the processor before power supply to the processor is stopped;
if the printed matter exists in the sheet discharge portion when the operation mode shifts from the power-saving mode to the normal mode, resuming measurement of the elapsed time by the processor;
when the time measured by the processor reaches a predetermined first reference time, notifying a notification destination corresponding to a transmission source of the print job, that the printed matter has not been collected;
when the sensor detects that the sheet discharge portion changes from an existing state, where the printed matter exists in the sheet discharge portion, to a non-existing state, where the printed matter does not exist in the sheet discharge portion, determining whether or not the printed matter has been collected, based on how long the sheet discharge portion is in the non-existing state; and
when it is determined that the printed matter has not been collected and elapsed times are being measured for a plurality of print jobs, displaying a selection screen on a display portion, the selection screen used for selecting one or more of the plurality of print jobs, wherein
the elapsed time is a time period from when the print job ends until when the determination processing portion determines that the printed matter has been collected, and
the processor ends measurement of the elapsed time of the print job that is selected on the selection screen.

* * * * *